X 7191E

May 16, 1939. T. E. HORST ET AL Re. 21,081

HINGE Orig. No. 2071,070

Original Filed Jan. 31, 1935 2 Sheets-Sheet 1

248,120

INVENTOR.
Tallmon Ethan Horst
BY
Zebel Carlson & Wells
ATTORNEYS

4

May 16, 1939. T. E. HORST ET AL Re. 21,081

HINGE

Original Filed Jan. 31, 1935 2 Sheets-Sheet 2

INVENTOR.
Tallmon Ethan Horst
BY
Gabel Barlow & Wells
ATTORNEY.

Reissued May 16, 1939

Re. 21,081

UNITED STATES PATENT OFFICE 21,081

HINGE

Tallmon Ethan Horst, Chicago, Ill.

Original No. 2,071,070, dated February 16, 1937, Serial No. 4,287, January 31, 1935. Application for reissue December 28, 1938, Serial No. 248,120

10 Claims. (Cl. 16—164)

This invention relates to hinges and is particularly applicable to structures wherein it is desired to conceal the hinge mechanism when the door or closure element is in the closed position although the use of the hinge is not at all limited in this respect.

The most common type of hinge is merely two members pivoted together on a suitable axis so that one may be rotated relative to the other, and these two members are suitably fixed to the supporting and supported structures.

In order that the description may be more readily understood, I will, throughout the description, refer to the two members to be connected together for swinging movement as panels although it is obvious that one of the panels may consist of a door or a bar and the other panel may suitably consist of any supporting structure such as a framework, a casing, or an ordinary panel or wall.

In considering the requisite features of a good hinge, particularly when it is to be used as a concealed hinge, it is necessary to hide the hinge elements so that they will not be visible from the front side of the panels, that is the side usually exposed to view. Usually the hinge should be capable of turning the panels through 180° although in a number of instances the 90° turn is sufficient. A good example of this is the automobile door hinge. Another characteristic of the hinge is that it must be free acting at all points. A further characteristic of a hinge is that it should hold the panels securely, that is to say, free from all lost motion or undesirable movement, particularly as to "end play" when the door is in closed position. Further, the movement of all parts with respect to each other where they are connected should be pivotal. The hinge must also be simple, sturdy, and economical to manufacture and require little or no attention once it is installed.

Now, the two panels when closed are to make a tight joint, and the hinge is also to be concealed. Then the line about which the panels pivot must be on one side or coincident with the junction of the front surfaces of the panels where they join, and the hinge must be on the other or the back side of the line of jointure.

It is the purpose of this invention to provide a hinge mechanism in which the pivotal point about which the panels move with respect to each other may be located at the junction of the front surfaces of the panel or in front of the junction while the mechanical elements of the hinge are all behind the junction of the front surfaces.

My invention contemplates further the provision of a hinge of this character wherein the hinge elements on one of the panels are pivoted to the hinge elements on the other panel in such a fashion that the pivotal axis of the hinge elements cannot at any time coincide with the pivotal axis of the panels.

My invention further contemplates a hinge of this character wherein the pivotal axes of the hinge elements where they are connected to each other shall, when the panels are in open or closed position, lie at right angles to the axis about which the panels pivot.

In carrying out the purposes of the invention, I have found that, in order to have positive movement of the hinge elements or links which connect the panels to each other, it is necessary to use more than two pairs of elements to avoid all of the undesired or lost motion movements throughout the complete swing of the panels with respect to each other.

I have found also that it is necessary to pivot the links or elements to their respective panels on an axis which is located at an acute angle to any plane through the pivot axis of the panels.

I have found that the pivotal axes of the hinge elements or links to their respective panels should each be directed along the diagonal of an imaginary cube of which the axis about which the panels pivot is one edge. The imaginary cube for each hinge axis is of course different from the others, but each cube includes the pivotal axis as one edge. The position of the pivotal axis of the panels with respect to the points of mounting of the links on their respective panels determines the size and position of each cube for its respective link.

Other features and advantages of the invention will appear more clearly in the following more detailed description when taken with the accompanying drawings wherein certain forms of the invention are shown. It is to be understood, however, that the drawings and description are illustrative only and are not to be taken as limiting the invention except in so far as it is limited by the claims.

In the drawings—

Fig. 4 is a view similar to Fig. 3 wherein one pair of the hinge elements is dispensed with;

Figure 1:
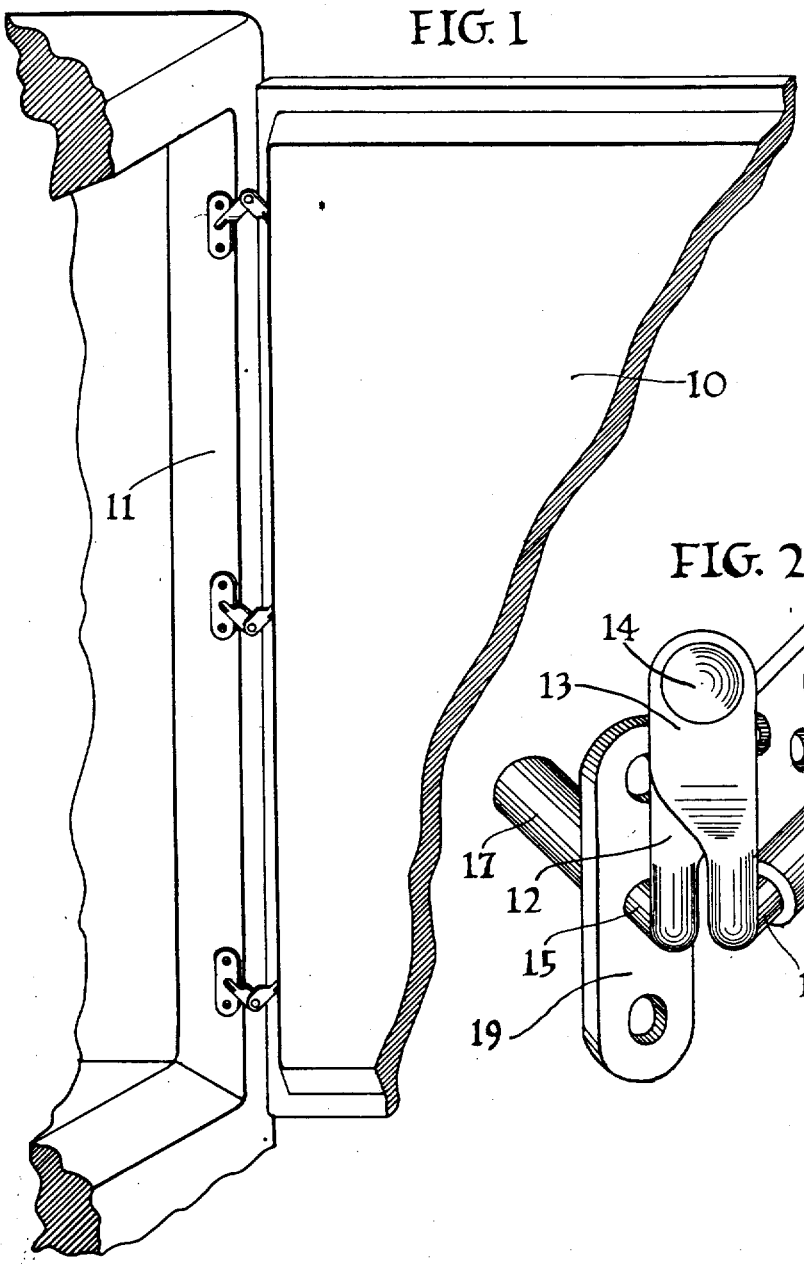
Fig. 1 is a perspective view of a portion of a cabinet and door showing a set of my hinges applied thereto.

Referring now in detail to the drawings, the hinge as applied in Fig. 1 connects the door panel 10 to the casing 11, there being three pairs of hinge elements used, each pair consisting of an element 12 and an element 13 pivoted together by means of the rivet 14 and secured by means of the angularly bent ends 15 and 16 in the sockets 17 and 18 which are formed on the plates 19 and 20. Plates 19 and 20 are, of course, intended to be fastened to the casing 11 and the door 10, respectively, by suitable screws or other means. The ends 15 and 16 of the link elements 12 and 13 are preferably secured against endwise movement in their respective sockets, as for example by means of the pin 21 riding in the slot 22, the pin being fastened in the angularly bent end of the hinge element, and the slot being provided in the socket.

Figure 3:
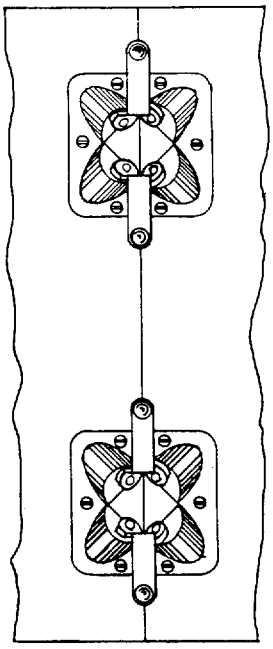
Fig. 3 is a front elevation of a modified form of the hinge connecting two panels together.
Figure 4:
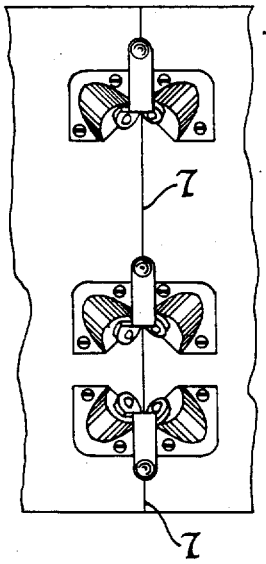
Figure 5:
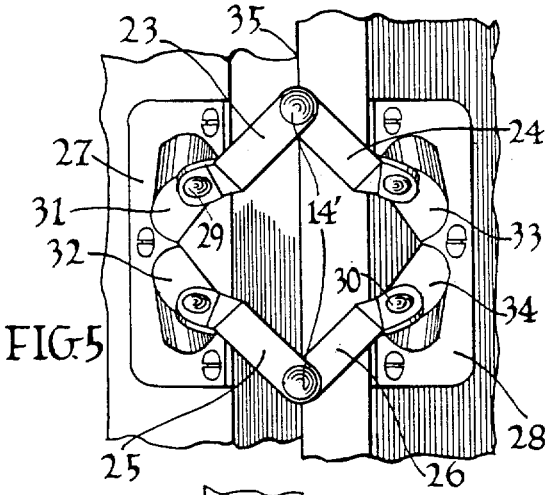
Fig. 5 is an enlarged view showing two pairs of hinge elements in a single assembly where the panels have been opened.
Figure 6:
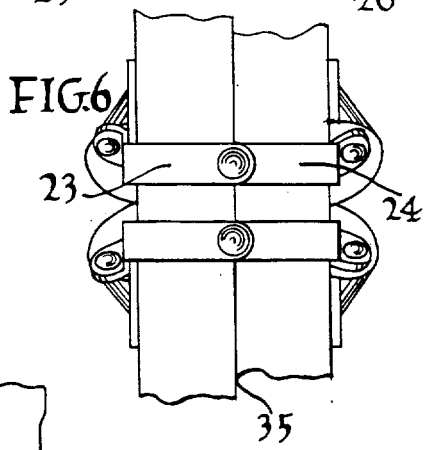
Fig. 6 is an enlarged view showing the position of the hinge elements when the panels have been completely opened.
Figure 7:
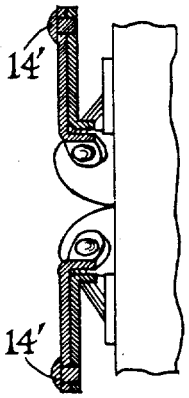
Fig. 7 is a vertical sectional view taken substantially on the line 7—7 of Fig. 4.

In Figs. 3, 5 and 6, the hinge elements are grouped so that four links 23, 24, 25, and 26 may be carried by two attaching plates 27 and 28 which are attached to the panels. The links are pivotally connected to each other, as for example by the rivets 14', and are riveted by means of suitable rivets such as 29 and 30 to the bosses 31, 32, 33, and 34 formed on the plate members 27 and 28. The hinge elements are shown in Figs. 3, 4, and 7 in their completely closed position, that is with the panels abutting each other.

Now, when the panels are opened, they swing about the edge opposite the edge to which the hinge elements are attached. This edge is indicated in Figs. 5 and 6 at 35. In Fig. 5, the panels have swung half open or through an angle of 90° from the position shown in Fig. 3, while in Fig. 6 the panels are in the completely open position.

It will be noted from an examination of Figs. 3 to 7 that the hinge elements such as 23 and 24, when the panels are closed, lie parallel to each other, and the axes of the rivets 14' are directly at right angles to the line about which the panels pivot. The hinge elements are also spaced away from the pivot line of the panels a distance somewhat greater than the thickness of the panels.

Now as the one panel is swung or pivoted with respect to the other, the links 23 and 24 are separated and drawn outwardly so as to bring the upper and lower rivets 14' shown in Fig. 3 closer together. The complete swing through 180° now brings the links 23 and 24 into a horizontal position, and the pivotal connection of these links by means of the rivet 14' has moved in toward the pivotal axis 35 and is again at right angles to it.

It is believed to be evident that, by lengthening or shortening the links 23 and 24 to adapt them to any particular thickness of panel, they may be mounted on the inside surfaces of the panels and cause the panels to swing about a line at the junction of their outside surfaces.

Further, by using longer links 23 and 24 than are necessary for the thickness of the panels, these panels may be made to swing about a pivotal axis that is outside or beyond their outer surfaces any desired distance. In any such structure, the pivotal axis connecting the links 23 and 24 will in both the closed and 180° open positions of the panels be directly at right angles to the pivotal axis of the panels. Furthermore, when the panels are closed together, the links will be lined up parallel to the axis about which the panels swing; and, when the panels are opened the full 180°, the links will lie crosswise or at right angles to the pivotal axis of the panels.

The aforementioned results are obtained principally by the proper positioning of the axes about which the links turn where they are connected to the panels. In the structure shown in Figs. 3 to 7, I find that the proper direction of the link axis is a direction which will cause the axis to fall within a plane perpendicular to the front surface of the panel and making an angle of 45 degrees with the pivotal axis of the panel. I find also that this axis would lie in a plane which is perpendicular to the end face of the panel and makes an angle of 45 degrees with the pivotal axis of the panel. Incidentally, this works out to be the diagonal of a cube of which one edge is the pivotal axis of the panel, one face is a plane parallel to the panel through the pivotal axis of the panel, and another face is a plane perpendicular to the panel through the pivotal axis of the panel.

Figure 2:
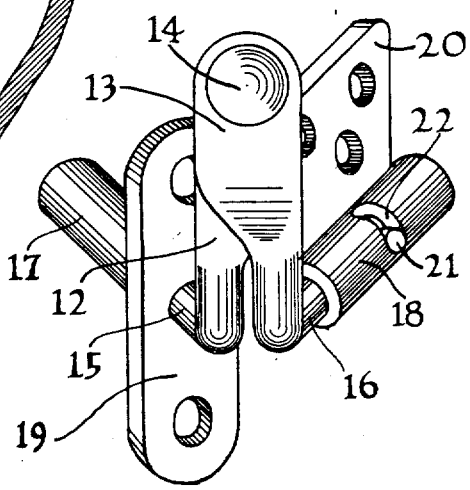
Fig. 2 is a front elevational view of the hinge.

Referring back now to Figs. 1 and 2, the link elements 12 and 13 have their end portions 15 and 16 angularly directed on the diagonal of a cube in the same fashion as the axes of the rivets 29 and 30 are located in Figs. 3 to 7. It is immaterial from the functional standpoint whether the portions 15 and 16 are directed upwardly on the diagonal or downwardly on the diagonal in a direction, for example, exactly opposite to the direction of the members 15 and 16.

I find that in using these hinges, if only two pairs of links are used, then at one point in the swinging movement through 180° there is an unstable position in which the one panel might swing out of alignment with the initial pivotal axis. However, by using three pairs of link elements and spacing them in any position desired with at least one pair of links swinging in the opposite direction to another pair, the movement of the one panel with respect to the other is a true pivotal movement about a single line which by adjustment of the links may be made to coincide with the outer surfaces of the panels or be spaced outwardly therefrom.

By setting one pair of links in opposition to another, the two pairs of links in swinging from closed position toward open position arrive at one point in their travel to a position where the pivotal axes on their respective panels of the two links of one pair are parallel. Also the pivotal axes on their respective panels of the two links of the other pair are parallel, but the plane of the pivotal axes of the first pair of links is at an angle to the plane of the pivotal axes of the second pair of links.

With this structure, it is believed to be evident that the links may be set at different angles with respect to the planes of their panels without interfering with their functioning in the least. Thus the pivotal axis about which a door swings with respect to a casing may be placed outside the door and casing and need not be in line with the junction line of the door and casing. It is only necessary to arbitrarily select the pivotal axis, then so mount the links on the door and casing that the axes on which the links connect to each other lie in a plane including the pivotal axis and make the links of the proper length to cause swinging about the selected pivotal axis.

The links themselves may be curved, bent, or offset to get around the adjacent portions of the panels. Any rigid connection between the pivotal connection of two links together and the pivotal connection of a link with its panel is therefore a link.

From the above description, it is believed that the construction and operation of this hinge structure will be clear to those skilled in this art.

Having thus described my invention, what I claim as new and desire to secure by United States Letters Patent is:

1. A hinge structure comprising pairs of links, the two links of each pair being pivoted together and having means at their extremities for securing the links to a pair of members to be connected together for swinging movement with respect to each other, at least one of the pivotal axes of the hinge links to the members being disposed at an acute angle with respect to any plane including the axis on which the links are pivoted to each other.

2. A hinge mechanism for connecting two panel elements for swinging movement with respect to each other, said hinge mechanism comprising pairs of hinge links, the extremities of which are pivoted to respective elements and to each other, the pivotal axes connecting the respective links of each pair of links together being disposed at an angle to the pivotal axis of the panel elements in all positions of the panel elements, the pivotal axis connecting said links to each other being disposed at right angles to the pivotal axis of the panel element in the limiting or wide open position of said panel elements when said links are parallel.

3. A hinge mechanism for connecting two panel elements for swinging movement with respect to each other, said hinge mechanism comprising pairs of hinge links, the extremities of which are pivoted to respective elements and to each other, the pivotal axes connecting the respective links of each pair of links together being disposed at an angle to the pivotal axis of the panel elements in all positions of the panel elements, the pivotal axis of each link to its respective panel elements being directed on the diagonal of a cube of which the pivotal axis of the panel elements is one edge.

4. A hinge mechanism for connecting two panel elements for swinging movement with respect to each other, said hinge mechanism comprising pairs of hinge links, the extremities of which are pivoted to respective elements and to each other, the pivotal axes connecting the respective links of each pair of links together being disposed at an angle to the pivotal axis of the panel elements in all positions of the panel elements, one pair of said links being mounted to swing in the opposite direction with respect to another pair of said links.

5. A hinge mechanism for connecting two elements for pivotal movement with respect to each other, said mechanism comprising a plurality of hinge links pivotally connected in spaced pairs, means pivoting one link of each pair of links to one of said elements and the other link of each pair to the other of said elements, there being at least three pairs of said links with at least two of said pairs swinging in opposite directions, the axis on which each link is pivoted to its element being located in a plane making an angle of substantially 45° with a plane perpendicular to the axis on which said links are pivoted to each other, and a like angle with the pivotal axis on which the two links are connected together.

6. A hinge unit comprising a pair of links, means pivotally connecting adjacent ends of said links together for parallel swinging movement about said means as an axis, said links having bearing portions at their free ends directed at angles of forty-five degrees to any plane including the first named axis, and to the plane in which said links swing about said axis.

7. A hinge unit comprising a pair of links pivoted on a common axis and having their free ends provided with portions for pivotally mounting to the elements which are to be hinged together, said portions having their pivotal axes in a common plane which is always at an angle of substantially forty-five degrees with said common axis.

8. A hinge for connecting a door and support comprising a pair of link members, one link member having integral arms extending at an angle to each other, a supporting socket, the end portion of one arm being round in cross section and rotatively engaging said supporting socket during operation of the hinge by the swinging of the door whereby a substantial length thereof has bearing in the socket, a pivotal connection between the free end of the other arm and the other link member, and means for mounting the other link member to enable same to rotate about an axis different than the axis of said pivotal connection.

9. A hinge for connecting a door and support comprising a pair of link members, one link member having integral arms extending at an angle to each other, a supporting socket, the end portion of one arm being round in cross section and rotatively engaging said supporting socket during operation of the hinge by the swinging of the door whereby a substantial length thereof has bearing in the socket, the other link member constituting a one piece rigid part, a pivotal connection between the free end of the other arm and the other link member, and means for mounting the other link member to enable same to rotate axially as a result of movement of the links about said pivotal connection.

10. A hinge for connecting a door and support comprising a pair of link members, one link member having integral arms extending at an angle to each other, a supporting socket, the end portion of one arm being round in cross section and rotatively engaging said supporting socket during operation of the hinge by the swinging of the door whereby a substantial length thereof has bearing in the socket, a pivotal connection between the free end of the other arm and the other link member, the axis of said pivotal connection being disposed in a different plane from the axis of rotation of said first link member, and means for mounting the other link member to enable same to rotate.

TALLMON ETHAN HORST.